US010506315B1

(12) United States Patent
Chapman et al.

(10) Patent No.: US 10,506,315 B1
(45) Date of Patent: Dec. 10, 2019

(54) ACCOUSTICALLY AND VISUALLY OPTIMIZED PROJECTION SCREEN (71) Applicant: DISNEY ENTERPRISES, INC., Burbank, CA (US)

(72) Inventors: Steven M. Chapman, Newbury Park, CA (US); Mason Daryl Lev, Signal Hill, CA (US); Bryan L. Jolley, Burbank, CA (US); Jeffrey A. Davis, Long Beach, CA (US); Thomas F. Laduke, Orange, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 29 days.

(21) Appl. No.: 16/016,907

(22) Filed: Jun. 25, 2018

(51) Int. Cl.
H04R 1/02 (2006.01)
G03B 21/56 (2006.01)

(52) U.S. Cl.
CPC .............. H04R 1/023 (2013.01); G03B 21/56 (2013.01); G03B 21/565 (2013.01); H04R 1/028 (2013.01)

(58) Field of Classification Search
CPC .................................................. G03B 21/565
USPC ........................................................ 359/445
See application file for complete search history.

(56) References Cited

U.S. PATENT DOCUMENTS

| 1,884,724 | A | * | 10/1932 | Keller | H04R 1/2803 |
| | | | | | 181/148 |
| 7,777,947 | B2 | * | 8/2010 | Congard | G03B 21/56 |
| | | | | | 359/445 |
| 2006/0182299 | A1 | * | 8/2006 | Whitehouse | H04R 1/023 |
| | | | | | 381/353 |
| 2017/0347214 | A1 | * | 11/2017 | Kim | H04R 31/00 |

FOREIGN PATENT DOCUMENTS

DE 102011008995 A1 * 6/2012 ............. H04R 1/023

* cited by examiner

Primary Examiner — Christopher E Mahoney
(74) Attorney, Agent, or Firm — Marsh Fischmann & Breyfogle LLP; Kent A. Lembke (57) ABSTRACT An acoustical screen that can be utilized in a variety of applications including as part of a projection screen to cover and hide the presence of an audio speaker. The acoustical screen is formed using multiple hole sizes, e.g., three or more hole diameters or outer dimensions if not round. These differently-sized holes are placed in pseudo-random positions so that there is no perceivable repeating pattern of hole placement in the acoustical screen. By avoiding an ordered grid of holes of a single diameter as in prior speaker grills, the new acoustical screen disguises the visible reflection pattern through non-uniformity. It also provides an improved acoustic transmission surface that allows sound with a greater variety of wavelengths to pass while reflecting a less pronounced echo. The acoustical screen will be in demand for use in entertainment venues using projection systems with speakers positioned behind a front projected screen.

20 Claims, 10 Drawing Sheets

ACCOUSTICALLY AND VISUALLY OPTIMIZED PROJECTION SCREEN

BACKGROUND

1. Field of the Description

The present description relates, in general, to designs for and methods of making projection screens and acoustic screens. More particularly, the description relates to a screen (or mask) that is optimized for projection while also being designed for improved acoustical transmission from a speaker positioned behind the screen.

2. Relevant Background

There are many applications where it is desirable to position an audio speaker behind a projection screen. For example, a front projected screen may be provided in a theater, along an amusement park ride, or in a show space of a theme park or other entertainment venue, and one or more audio speakers are hidden from view by positioning them behind the projection screen. In such applications, it is desirable for the portion of the projection screen covering the speaker to effectively transmit sound from the speaker while also reflecting projected light to limit effects on the projected imagery.

Unfortunately, to date, providing an acoustically and visually optimized projection screen has proven difficult. Many projection system designers have entirely avoided the problem of acoustic transmission through the projection screen by offsetting the speakers from the projection screen and using a solid projection surface as the projection screen. However, in many applications, this solution is not acceptable or desirable. Offsetting the speakers can produce a notable dislocation of the sound source from the projected sound emitter. For example, a projected character will be at one location on the projection screen while the character's voice will emit from a distinctly different location from where their mouth is shown to be moving on the projection screen.

In other system designs, the speaker is positioned behind the projection screen, and the projection screen is fabricated using construction techniques intended to be acoustically transmissive while attempting to maintain attenuated light reflection to prevent specular hotspots. To this end, a conventional design for a speaker grill or screen is typically used for the portion of the projection screen covering the speaker.

Figure 1:
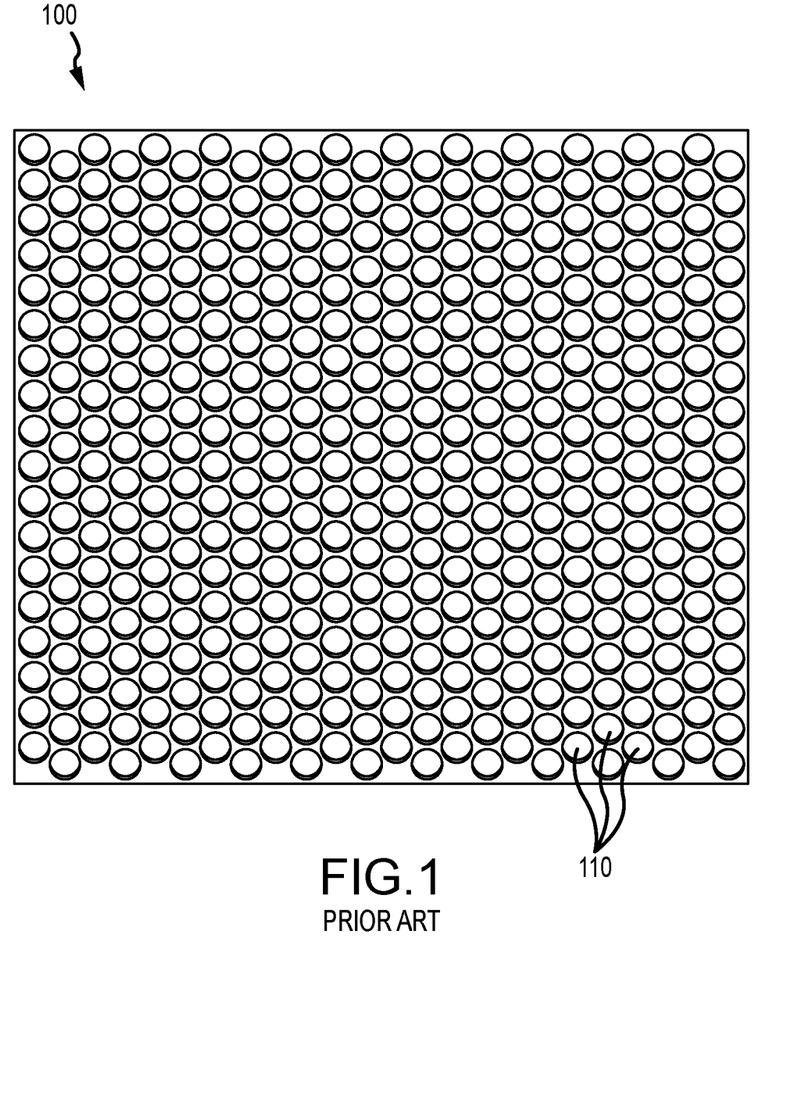
FIG. 1 illustrates a sheet of material useful for a speaker grill.
Figure 2:
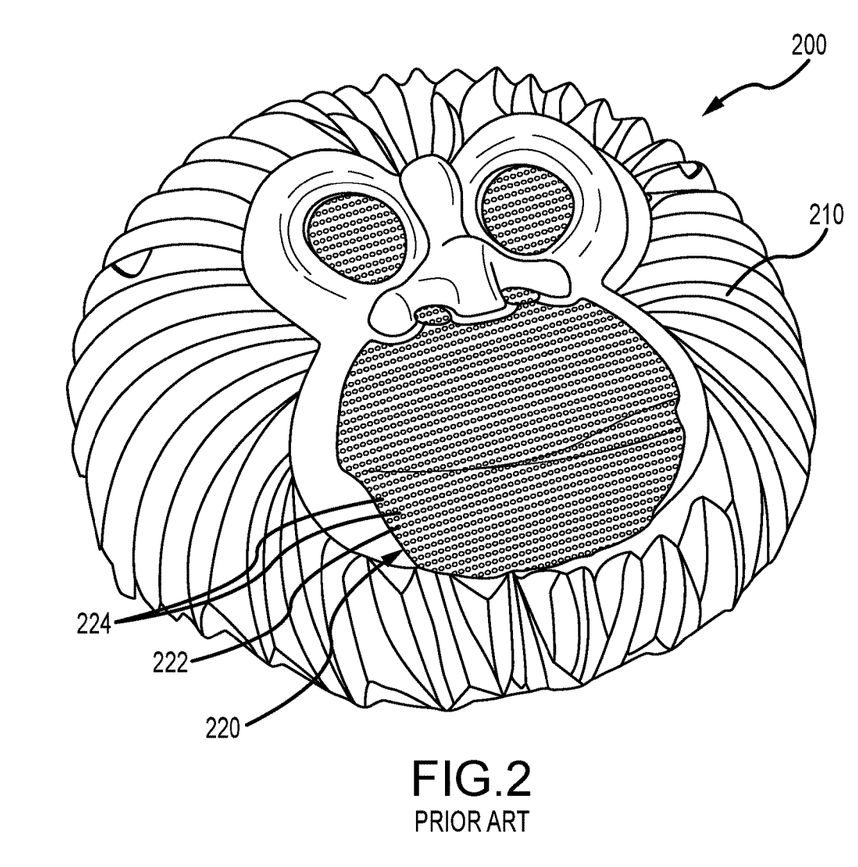
FIG. 2 illustrates an exemplary prior art projection screen with a speaker grill or speaker-covering portion with a repeating pattern of uniformly-sized holes.

For example, FIG. 1 illustrates a sheet 100 of material that may be used as a speaker grill, and a similar hole pattern may be used in a projection screen to hide or mask the presence of a speaker while being acoustically transmissive. As shown, the sheet 100, which may be a thin sheet of aluminum, includes numerous holes 110 that are arranged in a uniform pattern (e.g., staggered rows), and each of the holes has a matching diameter (e.g., in the range of ⅛-inch to 5/16-inch diameter holes or the like). FIG. 2 shows a projection screen 200 with portions formed of conventional projection material (i.e., solid screen) and a speaker-covering portion 220 that would be positioned over an audio speaker during use. The speaker-covering portion 220 has a repeating pattern of uniformly-sized (e.g., ⅛-inch diameter) holes 222 configured for transmitting sound from a covered or masked speaker and has material 224 between the holes 222 that is used to reflect light that is front projected onto the projection screen.

The result of this combined duty of the portion of the screen covering the speakers is neither of these two duties, or design goals, is completely effective or fully satisfied. Specifically, the ordered and uniformed holes (e.g., holes 110 and 222 in FIGS. 1 and 2) that allow passage of sound act to create a wave barrier that negatively affects audio fidelity. Further, as can be seen easily in FIG. 2, the repeating pattern of uniformly-sized holes 222 presents a distinct visible grid pattern that reveals itself as a dimensional surface that is readily visible to the viewer even from relatively large distances (8 to 12 feet or the like). The visibility of the speaker-covering portion 220 spoils the illusion of greater depth that might be contained in the media projected onto the screen 200.

Hence, there remains a need for a new design for a speaker screen, mask, or grill that can be used as part of a projection screen. While the existing designs with uniform hole sizes and spacing are easy to fabricate, the existing speaker screen materials create audible and visual artifacts. The new designs would, therefore, preferably reduce the visibility of the screen material when used on a projection screen and provide improved acoustic transmission from a speaker hidden behind the front projected screen.

SUMMARY

To address the above and other needs, a new method for designing and fabricating an acoustical mask or screen is provided herein, and the acoustical screen can be utilized in a variety of applications including as part of a projection screen to cover an audio speaker. The screen is labeled "acoustical" because it is designed to provide better transmission of sound than prior screens with uniformly-sized holes, and the acoustical screen is useful in front projected projection screens because it is better designed for reflecting light than prior material as it is much less visible to a typical viewer. In some testing, the acoustical screen was unperceivable to a viewer at a planned viewing distance, e.g., in the range of 8 to 15 feet or more.

Briefly, the acoustical screen is formed using multiple hole sizes (e.g., three or more hole diameters or outer dimensions if not round). These differently or non-uniformly-sized holes are placed in pseudo-random positions so that there is no perceivable repeating pattern of hole placement in the acoustical screen. By avoiding use of an ordered grid of holes of a single diameter as in prior speaker grills and acoustic mask materials, the new acoustical screen disguises the visible reflection pattern through non-uniformity. It also provides an improved acoustic transmission surface that allows sound with a greater variety of wavelengths to pass while reflecting a less pronounced echo by randomizing the back-reflected sound space surface. The acoustical screen likely will be in demand for use in home entertainment applications to better hide speakers as well as in movie theaters, theme parks, and other entertainment venues that use projection systems in which speakers are positioned behind a front projected screen.

More particularly, a system is described that is adapted to provide projection-based entertainment. The system includes a projection screen with a front projection surface and a projector operable to project light onto the front projection surface for reflection into a viewing space. The system also includes an audio speaker operable to output sound into the viewing space, and this speaker is positioned behind the projection screen adjacent a back surface of the projection screen opposite the front projection surface. Further, the system includes a screen assembly that has an acoustical screen with an outer surface facing toward the viewing space. The acoustical screen is positioned adjacent the front projection surface and so as to cover the audio speaker. The acoustical screen includes a plurality of holes with spacing material or screen fill (i.e., material making up the body of the screen) sandwiched adjacent between each pair of the holes. Significantly, the holes have at least a first size and a second size, greater than the first size, and the holes of the first and second sizes are arranged in a pseudo-random pattern in the acoustical screen, whereby the output sound from the audio speaker is transmitted through the holes of the acoustical screen.

In some embodiments, the first size is in the range of 1/16 to 1/8 inches, and the holes further include holes of a third size that is greater than the second size. The holes may have a circular cross sectional shape, and the holes have outer diameters in the range of 1/16 to 3/16 inches. In some preferred embodiments, the pseudo-random pattern is defined so that each of the holes has only a single neighboring one of the holes with a matching size. Also, the pseudo-random pattern may be defined with a predefined ratio of the holes having the first, second, and third sizes and with the predefined ratio enforced during a process of randomly selecting an order of placement of the holes in the pseudo-random pattern.

In some cases, the acoustical screen is coupled about its periphery with the projection screen, and the screen assembly further includes a backing fabric layer comprising an acoustically transmissive material extending over an inner surface of the acoustical screen. In these or other cases, the acoustical screen is formed of thin sheet of a metal or a plastic, and the outer surface is painted with a paint of a color matching a color of the projection surface (such as with an acrylic gray paint or the like).

DETAILED DESCRIPTION

Briefly, the following description provides an acoustical screen that is useful, for example, as a screen-covering portion of a projection screen to disguise or mask the presence of an audio speaker behind the projection screen. The acoustical screen is formed in a sheet of material (such as a thin metal (e.g., aluminum) sheet, a plastic sheet, or the like) using multiple hole sizes rather than a single hole size throughout as in prior speaker grill materials. The non-uniformly-sized holes are placed in pseudo-random positions so that there is no perceivable pattern repeated in the acoustical screen. The acoustical screen also provides an improved acoustic transmission surface that allows sound with a greater variety of wavelengths to pass while reflecting a less pronounced echo by randomizing the back-reflected sound space surface.

The method of designing and fabricating the acoustical screen involves use of a computer-implemented algorithm (e.g., a computer running specially designed software) that is given input as to the desired screen size, the desired hole sizes, the desired separation distance between adjacent holes ("screen fill" or "spacing sections or material"), the desired area ratios (i.e., how many holes of each size), and, in some embodiments, additional parameters to ameliorate randomly occurring clump patterns or clumps/clusters of holes of a particular size. The software is configured to process this input and generate a pattern for an acoustical screen including the differently-sized holes in a pseudo-random pattern. The software may also use a physics simulation to "pack" or tighten the pattern to eliminate unwanted voids. The output of the software is, in some cases, a fabrication-ready file such as a computer-aided design (CAD) file that can then be used in fabrication of the material for the acoustic screen.

Figure 3:
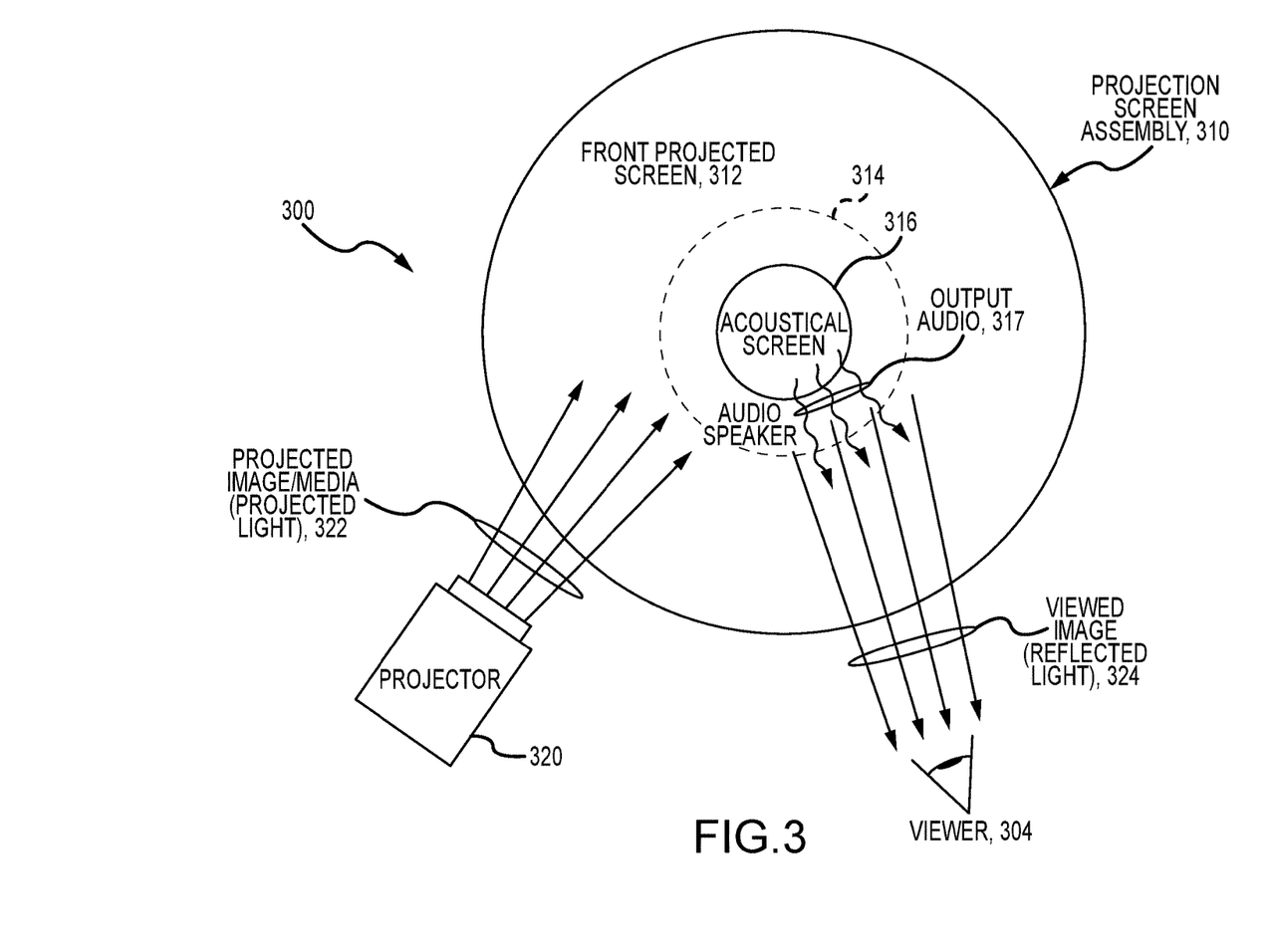
FIG. 3 illustrates a functional block diagram of an entertainment system of the present description.

FIG. 3 illustrates an entertainment or display system 300 implementing an acoustical screen 316, which may be fabricated as discussed above and in more detail in the following paragraphs. The system 300 includes a projection screen assembly 310 that may be positioned in a space such as a theater or along a park ride for viewing by a viewer 304. The assembly 310 includes a screen 312 that is configured for front projection, e.g., a sheet of conventional projection screen material. A projector 320 is included in the system 300 and is operated as shown to project light or media 322 onto the screen 312, and light 324 is reflected by the material of the screen 312 to the viewer 304 to allow them to perceive one or more images or a set of media.

More significantly, though, the system 300 further includes an acoustical screen 316 formed with holes of three or more differing diameters/sizes arranged in a pseudo-random pattern. The screen or mask 316 is used to replace an area of the screen 312 and is coupled or attached about its periphery to adjacent portions of the screen 312. This may be achieved with caulking to mate with nearby portions of the projection screen 312, and it may be useful for this caulking to be intermittent in a random pattern to limit the ability of the viewer 304 to perceive a seam between the mask/screen 316 and adjacent portions of the projection screen 312.

The system 300 further includes an audio speaker 314 positioned behind the projection screen 312. The acoustical screen 316 is provided in a location of the assembly 310 such that it is covering the audio speaker 314. When the audio speaker 314 is operated (e.g., to play a soundtrack associated with the media 322 projected by the projector 320), the sound or output audio 317 is transmitted through the holes of the acoustical screen 316 so that it can be heard by the viewer 304. As discussed above, the use of differing sizes of holes in the acoustical screen 316 allows differing wavelengths of sound to be effectively transmitted with reduced echo so that it provides enhanced acoustical transmission when compared with prior speaker covers using uniformly-sized holes. The material of the acoustical screen 316 between the holes ("screen fill" or "spacing sections or material") may be a metal, a plastic, or other material, and it may be painted to be the same color as the front projected screen such as with an acrylic or other projection paint (e.g., a gray such as Dover Gray (518-5) from Pittsburgh Paints or the like).

Figure 4:
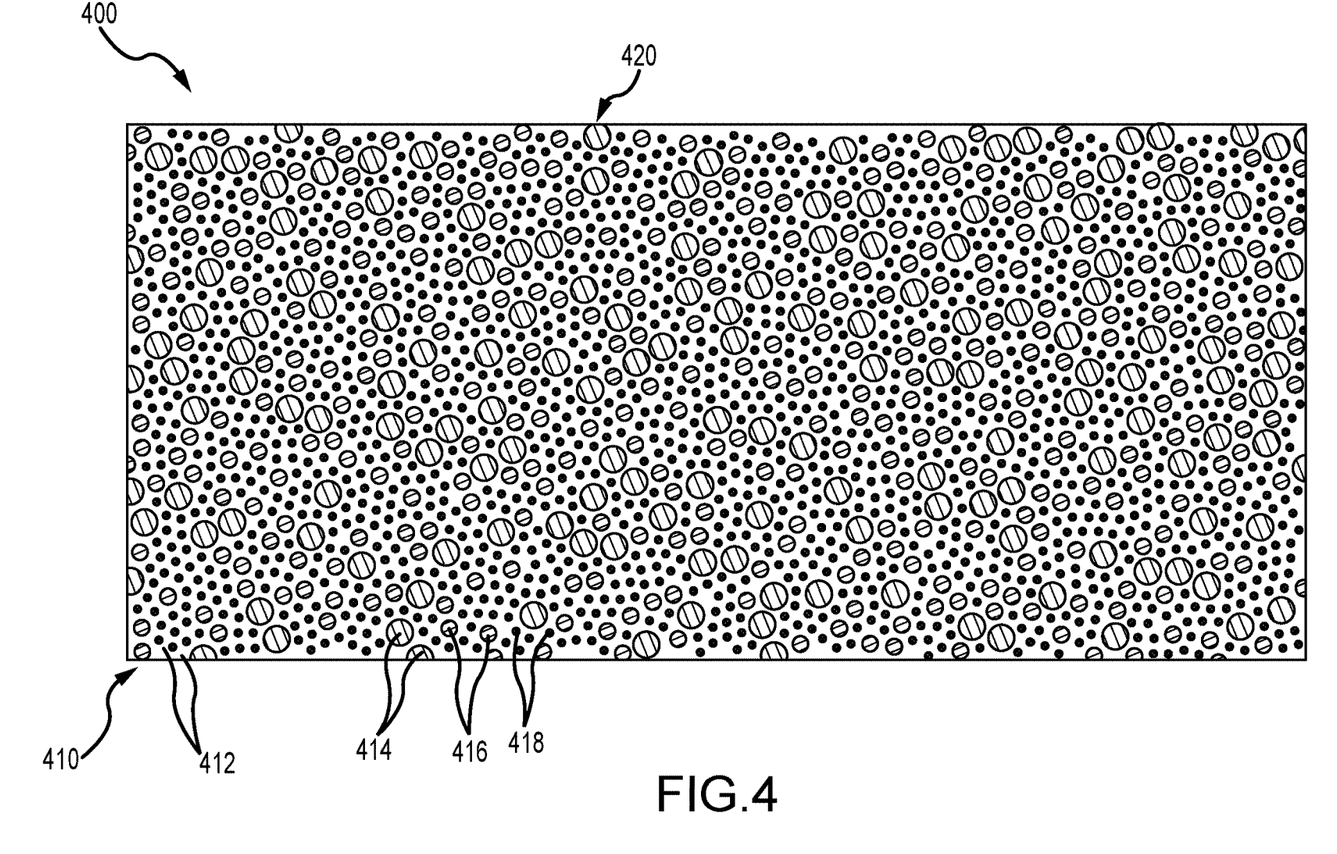
FIG. 4 is a front perspective view of an acoustical screen or mask assembly of the present description that may be used in the entertainment system of FIG. 3.

FIG. 4 illustrates one example of an acoustical screen (or mask) assembly 400 that may be used as the acoustical screen/mask 316 in the system 300 of FIG. 3. The assembly 400 includes an acoustical screen or screen body 410, which may be formed from a thin sheet of metal, gypsum, plastic, fiberglass, or the like (with one embodiment using a sheet of stainless steel with a thickness in the range of $3/1000$ to $6/1000$ inches such as $4/1000$-inch SS), and a backing layer 420, which may be provided as an acoustically transmissive fabric attached to a back side of the acoustical screen or screen body 410. In one embodiment, the backing layer is provided as a sheet of fabric such as poplin (e.g., a fog or other-colored Janus curtain from Dazian or the like). FIG. 4 illustrates the assembly 400 as it would be oriented in use with a front side of the acoustical screen or screen body 410 facing outward toward a viewing space and with the backing layer 420 facing or contacting an audio speaker.

The screen body 410 is porous to allow it to transmit sound. Specifically, the screen body 410 includes numerous holes or passageways 414, 416, and 418 extending through its entire thickness. As shown, the holes 414 have an outer diameter (OD) (or first OD) that is greater than an OD (or second OD) of the holes 416, and the second OD of holes 416 is greater than the OD (or third OD) of the holes 418. In some embodiments, the ODs of the holes 414, 416, and 418 are chosen so as to fall within the range of $1/32$ to $1/4$ inches (e.g., with the first OD at $3/16$ inches, the second OD at $1/8$ inches, and the third OD at $1/16$ inches).

The body 410 further includes screen fill or spacing material 412 between pairs of adjacent holes 414, 416, and 418, and the screen fill or spacing material 412 serves the dual purposes of providing projection surfaces to reflect light projected onto the screen body 410 and of providing the screen body 410 with structural rigidity. In some embodiments, the spacing or separation distance between adjacent holes 414, 416, and 418 is chosen to be in the range of $1/16$ to $1/8$ inches, with the separation distance typically being uniform throughout the body 410. As noted above, the front side (showing in FIG. 4) of the body 410 may be treated to allow it to reflect light in a similar manner to nearby portions of a projection screen such as by painting the screen fill or spacing material 412 with an acrylic paint of a color (e.g., a gray, a white, a silver, or the like) matching that of the front surface of the projection screen.

Figure 5:
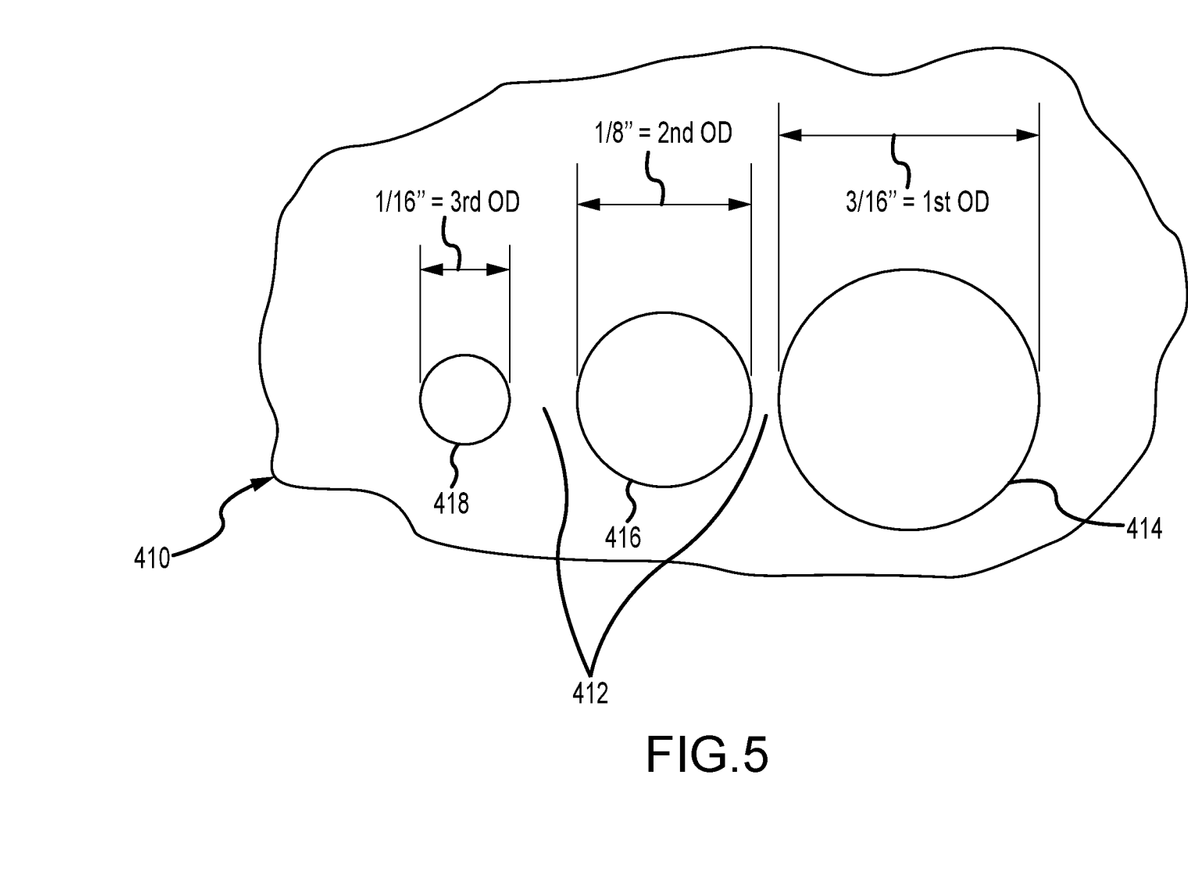
FIG. 5 is an enlarged view of a small section of the acoustical screen or screen body of FIG. 4.

FIG. 5 shows an enlarged view of a small section of the acoustical screen or screen body 410 of FIG. 4. As shown, three different sizes of holes 414, 416, and 418 are provided on the screen body 410 and are separated by screen fill or spacing material 412. The separation distance is shown to differ between different pairs of adjacent holes, but the separation distance may also be uniform to implement an acoustical screen of the present description. Holes of three different sizes are shown, but other embodiments may utilize four, five, or more sizes of holes. Also, the holes 414, 416, and 418 are all shown to be circular in shape, which is useful for ease of fabrication, but other embodiments may use holes with differing shapes such as triangular, square, or hexagonal holes.

In this specific implementation, the largest holes 414 are shown to have an OD of $3/16$ inches, the intermediately sized holes 416 are shown to have an OD of $1/8$ inches, and the smallest holes 418 are shown to have an OD of $1/16$ inches. Other OD sizes may be utilized (as noted above), but these three were found to be desirable in one tested prototype of the assembly 400. Particularly, the $1/16$-inch OD holes 418 were smaller than any holes of prior speaker grill materials (e.g., half the size of smallest prior grill openings), while still obtaining an acoustically transparent screen body 410 (on average).

Referring again to FIG. 4, it can be seen that there is no perceivable repeating pattern for the positioning of the differently-sized holes 414, 416, and 418. Instead, as described below, the inventors have developed a process for locating the holes 414, 416, and 418 in a pseudo-random manner or with a random hole pattern. This allows the use of smaller than normal holes such as holes 418 to still achieve an on average acoustically transparent screen 410. The random hole pattern also eliminates visual artifacts such as a moiré pattern, which may make the presence of the acoustical screen 410 more apparent to an observer.

In brief, the technique of selecting hole locations may involve filling from the bottom of a screen area with the hole size and drop point along the top edge of the screen area being randomly selected, and this process is repeated until the screen area is completely filled. The pattern is "pseudo" random in part because the ratios of the various hole sizes to the total is often forced or set by a screen designer as part of the process rather than relying on pure randomness. Further, the random selection and drop process may be modified to try to avoid clumps or clusters of holes of a certain size in the body 410, as these clumps or clusters may be perceived in some cases by a viewer.

Figure 6:
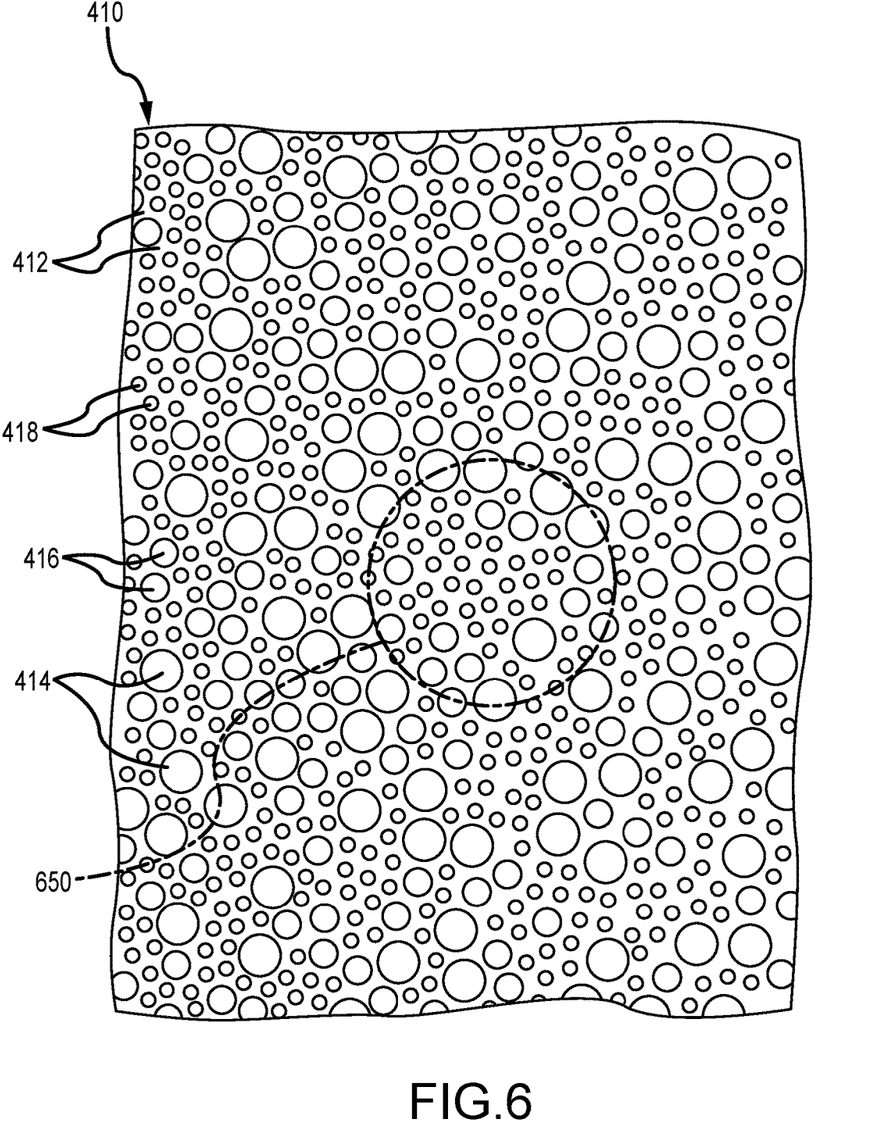
FIG. 6 is an enlarged view of a small section of the acoustical screen or screen body of FIG. 4 showing an identified cluster or clump of like-sized holes that can be eliminated prior to fabrication.

FIG. 6 illustrates, for example, a portion of the body 410 in which the holes 414, 416, 418 have been arranged into a random pattern. As shown in area 650, a cluster or clump of the smallest holes 418 is present on the body 410. An additional step during design can be used to identify and then break up this cluster or clump of holes 418 in the area 650. For example, after completion of the random selection and drop process, the design algorithm may include a step where each hole 414, 416, and 418 in the originally-formed hole pattern is inspected to determine whether or not it has only a certain number of neighboring holes of the same size (same OD in this case), with one prototype of the design algorithm only allowing one neighbor of the same size. If the maximum number of matching neighbors is exceeded, the hole 414, 416, or 418 presently being inspected or analyzed is moved (in a random manner) and inserted into the pattern at the new location (displacing nearby holes to move them to new locations, too). This process is then repeated for each hole in the pattern to look for clusters/clumps of like-sized holes and break up any found clusters/clumps.

Figure 7:
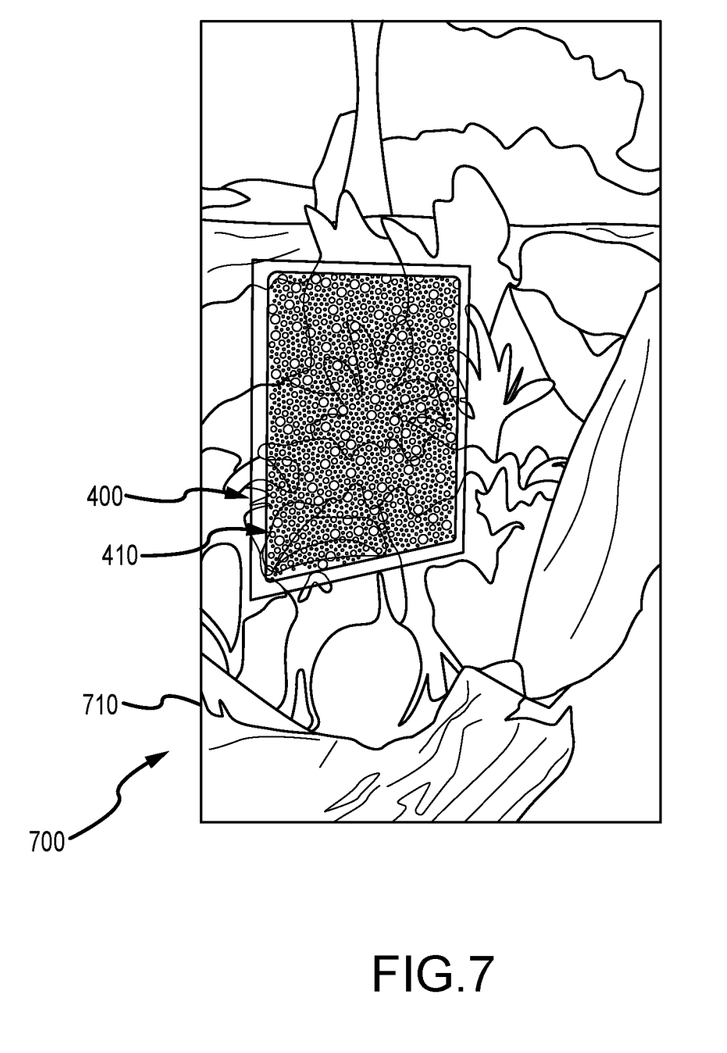
FIGS. 7 and 8 illustrate a projection screen assembly, which includes the acoustical screen assembly of FIG. 4, during its use from a first viewing position close to the screen surface and from second viewing position a greater distance from the screen surface.
Figure 8:
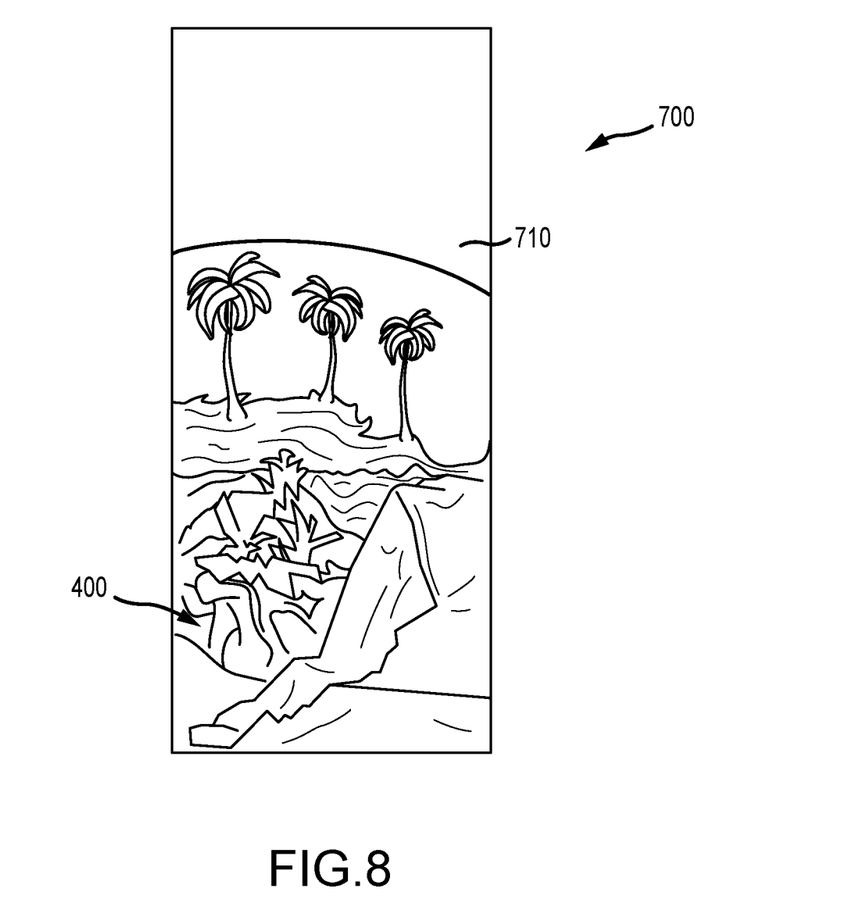

FIGS. 7 and 8 illustrate a projection screen assembly 700 during its use with a projector (not shown) to display imagery and as would be observed or perceived by a viewer in a viewing space. FIG. 7 shows the projection screen assembly 700 from a very close in viewing location such as 1 to 3 feet, which typically would not be an intended viewing distance for viewers in the viewing space. As shown, the assembly 700 includes a front projected screen 710 and the acoustical screen assembly 400 including the acoustical screen or screen body 410 (e.g., mated about its periphery to adjacent portions of the front projected screen 710).

From the close-in viewing location shown in FIG. 7, a viewer is able to detect or perceive the seams between the screen 710 and acoustical screen body 410 and also to detect the presence of the holes even when arranged in the pseudo-random pattern. However, FIG. 8 illustrates the same in-use projection screen assembly 700, and, at this second viewing location (such as 8 to 12 feet or more), a viewer is unlikely to be able to detect or perceive the presence of the acoustical screen body 410 because the holes are arranged in the pseudo-random pattern and because the holes have three different sizes. In use, in effect, the acoustical screen assembly 400 of the present description becomes lost in the larger screen 710 and effectively hides the presence of a speaker positioned behind its body 410, while still providing excellent sound transmission to viewers in the viewing space.

Figure 9:
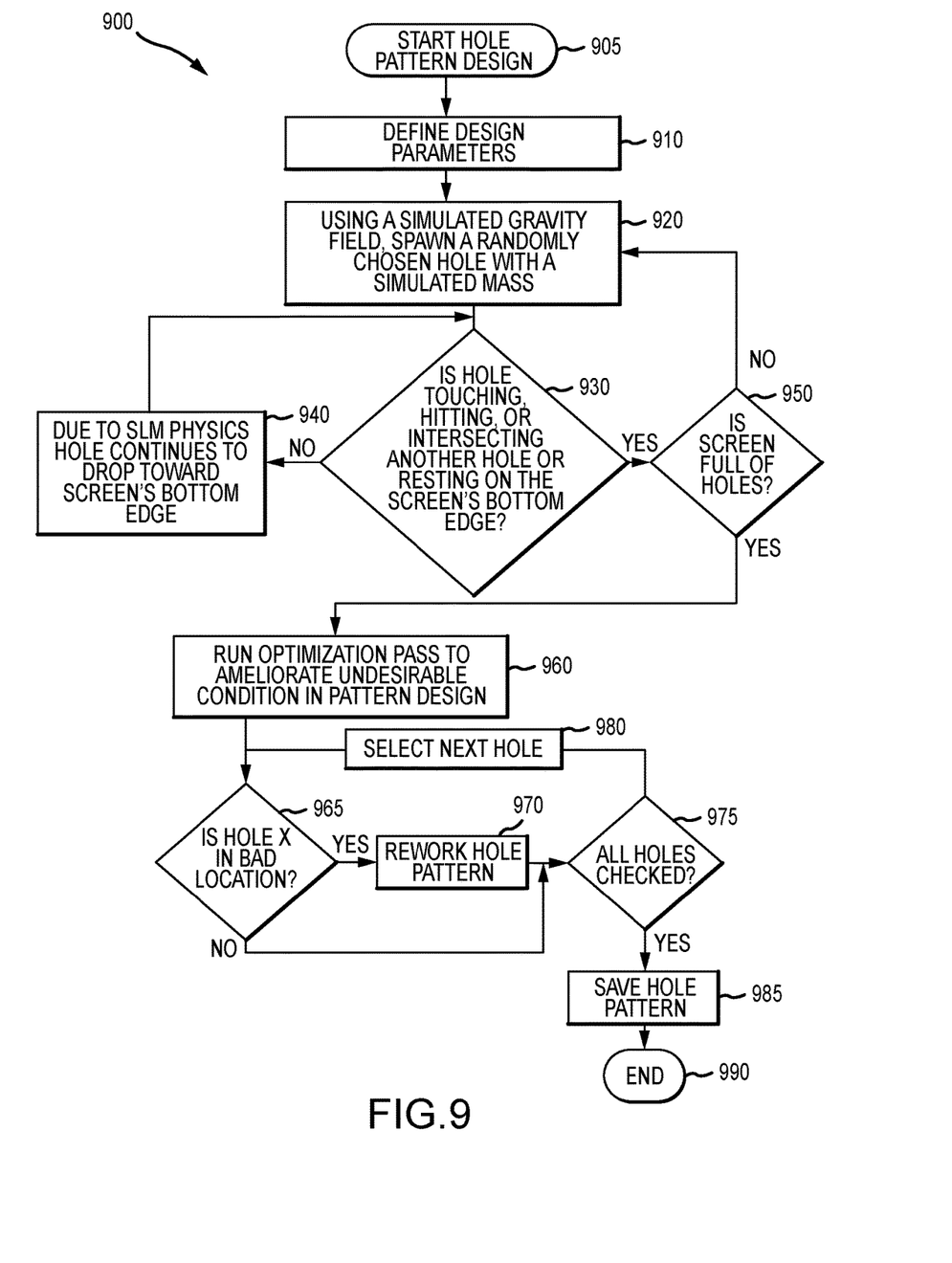
FIG. 9 illustrates a flow diagram of an exemplary algorithm or method for designing or generating a pseudo-random hole pattern for use in fabricating an acoustical screen.

FIG. 9 illustrates with a flow diagram an algorithm or method 900 for designing a pseudo-random hole pattern for an acoustical screen of the present description (such as screen 410 of FIG. 4). The method 900 starts at 905 such as with running a hole pattern design program on a computing device. The method 900 continues with step 910 that involves defining a set of design parameters or inputs that are used to create the hole pattern design. These parameters may be set as default values or be selected from lists or ranges of predefined values by an operator of the computing device. In some embodiments, the design parameters include: (a) a number or quantity of holes of differing sizes; (b) a hole size (e.g., diameter) for each (e.g., three or more hole sizes); (c) a spacing between neighboring holes in the pattern; and (d) a screen size.

The method 900 continues at 920 with spawning a randomly chosen hole with a simulated mass and dropping it from a randomly chosen location in a spawn area (an area "above" the top edge of the screen area). For example, in step 910, the number of differently-sized holes may be set at three. In step 920, the method 900 involves randomly selecting one of these three differently-sized holes to drop into the screen area next, and it drops due to the use of a simulated gravity field and by applying the simulated mass to the hole (e.g., with a mass of 1 unit or the like). In some cases, the number of each type (or different size) of hole is weighted to ensure an even area quantity of the three (or more) hole types are present in the created hole pattern.

In step 930, the method 900 continues with determining whether or not the dropped hole is now touching, hitting, or intersecting another hole (previously dropped hole) or whether the dropped hole is now resting on the bottom edge of the screen area. If not, the method 900 continues at 940 with the hole continuing to drop within the screen area toward the screen's bottom edge due to SLM physics. The method 900 then continues at 930 until the hole is dropped into a random location in the hole pattern being built up. Then, the method 900 continues at 950 with a determination of whether or not the screen area is now full of holes. If not full (free space still exists), the method 900 returns to step 920 with the selection of a next hole size/type to drop.

When the screen area is full, a preliminary hole pattern is completed, and this may be used in some cases to fabricate an acoustical screen by forming the differently-sized holes in the pseudo-random hole pattern in a sheet of metal, plastic, or other material and then, optionally, painting a front or outer surface in projection applications. In other cases, though, the method 900 continues at 960 with running an optimization pass to ameliorate undesirable conditions. For example, as discussed above, it may be desirable to identify and break up clusters or clumps of single-sized holes from the pattern formed through step 950. The optimization continues at 965 with inspecting a next hole in the pattern from step 950 to determine whether it is in a bad or less preferred position/location in the pattern. For example, it may have too many neighboring holes (more than one, more than two, more than three, or the like) that are of the same size, which may be used to identify a cluster or clump.

If the hole being inspected is not in a bad location at step 965, the method 900 continues at 975 with determining whether or not all holes in the pattern have been inspected. If yes, the method 900 may continue at step 985 with saving the generated hole pattern in memory for later use in fabricating an acoustical screen. With the pseudo-random hole pattern saved, the method 900 may then end at 990. If all holes have not been inspected at step 975, the method 900 continues at 980 with selecting a next hole in the pattern for inspection at step 965.

If the hole is determined to be in a bad position in step 965, the method 900 continues at 970 with reworking the hole pattern. This may involve generating a random new location for the hole presently being inspected and then moving the hole to the new location (and pressing it into the pattern causing other neighboring holes to be relocated or displaced from their prior positions). In this way, the unwanted clump or cluster of holes of like size is at least partially broken up. The method then continues at step 975 with a determination of whether or not all holes (which may each have an ID assigned to them in step 920 to allow them to be traced during processing) have been inspected. If yes, the method 900 continues with step 985, but, if no, the method 900 continues with step 980.

Figure 10:
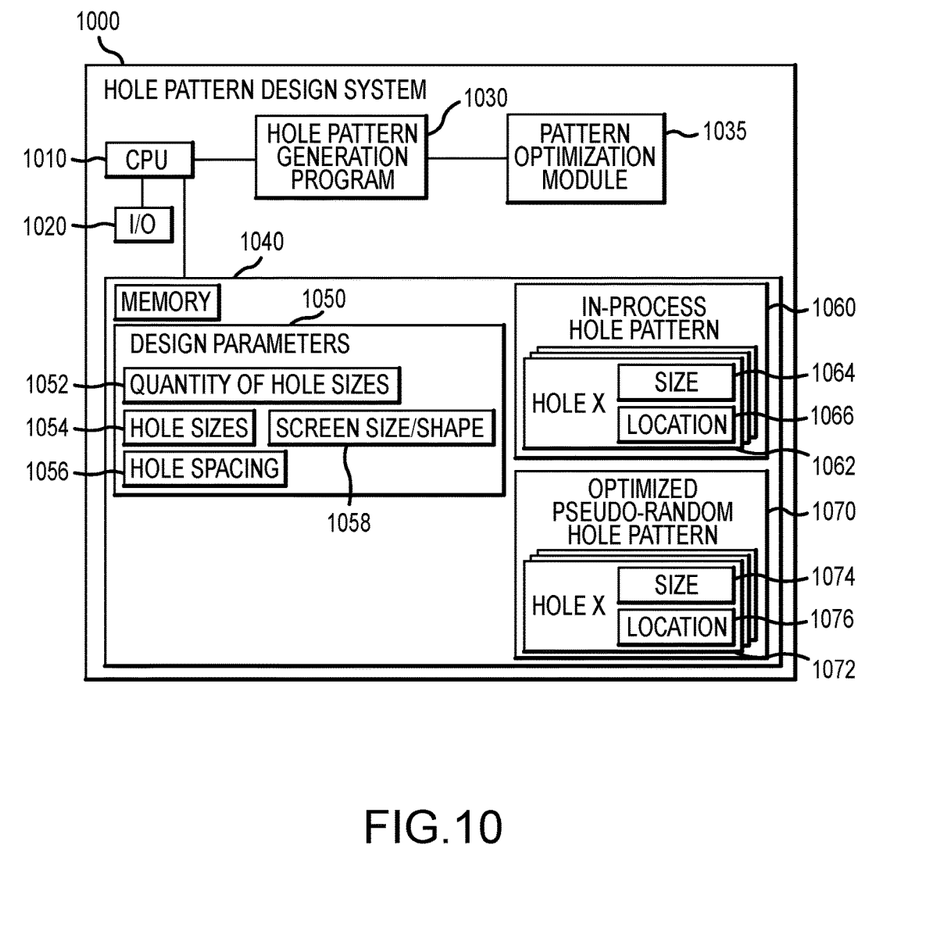
FIG. 10 is a functional block diagram of a system configured for operating to generate a pseudo-random hole pattern for an acoustical screen such as through implementing the algorithm of FIG. 9.

FIG. 10 illustrates a functional block diagram of a hole pattern design system 1000, which may be provided with any computing device specially configured as discussed herein. The system 1000 includes a processor 1010 that executes code or instructions (e.g., a software program) to provide the functionality of a hole pattern generation program 1030 and, optionally, a pattern optimization module 1035, and these components 1030, 1035 may implement the algorithm 900 of FIG. 9. The processor 1010 also manages operations of a set of input/output devices 1020 and one or more memory devices 1040. The I/O devices 1020 may include keyboards, a mouse, a touchscreen/pad, voice recognition software and hardware, and a display that may be used to display a GUI to allow an operator of the system 1000 to initiate the program 1030 and to provide input to define a set of design parameters 1050 that are stored in memory 1040 and are used by the program 1030 as input to create a random hole pattern for a screen.

As discussed with reference to the method 900 of FIG. 9, the design parameters 1050 may include: (a) a number or quantity of holes of differing sizes 1052; (b) a hole size (e.g., diameter) for each (e.g., three or more hole sizes) 1054; (c) a spacing between neighboring holes in the pattern 1056; and (d) a screen size (and shape in some cases) 1058. The hole pattern generation program 1030 processes the input values/design parameters 1050 and performs steps 920-950 of method 900 of FIG. 9. During the performance of these pattern generation steps, the program 1030 may operate to periodically store an in-process hole pattern 1060 that includes each hole 1062 selected and dropped into position so far, with a size 1064 and a location 1066 for each. The hole pattern generation program 1030 then may call the pattern optimization module 1035 to perform steps 960-985 of the method 900 of FIG. 9, and this results in the optimized pseudo-random hole pattern 1070 being generated and stored in the memory 1040, with a record for each hole 1072 that includes its size 1074 and its final location 1076.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for providing projection-based entertainment, comprising:
    a projection screen with a front projection surface;
    a projector operable to project light onto the front projection surface for reflection into a viewing space;
    an audio speaker operable to output sound into the viewing space and positioned behind the projection screen adjacent a back surface of the projection screen opposite the front projection surface; and
    a screen assembly including an acoustical screen with an outer surface facing toward the viewing space and adjacent the front projection surface and covering the audio speaker, wherein the acoustical screen comprises a plurality of holes with spacing material sandwiched adjacent between each pair of the holes and wherein the holes have at least a first size and a second size greater than the first size and wherein the holes of the first and second sizes are arranged in a pseudo-random pattern in the acoustical screen, whereby the output sound from the audio speaker is transmitted through the holes of the acoustical screen.

2. The system of claim 1, wherein the first size is in the range of 1/16 to 1/8 inches.

3. The system of claim 1, wherein the holes further comprise a third size greater than the second size.

4. The system of claim 3, wherein the holes have a circular cross sectional shape.

5. The system of claim 4, wherein the holes have outer diameters in the range of 1/16 to 3/16 inches.

6. The system of claim 3, wherein the pseudo-random pattern is defined so that each of the holes has only a single neighboring one of the holes with a matching size.

7. The system of claim 3, wherein the pseudo-random pattern is defined with a predefined ratio of the holes having the first, second, and third sizes and with the predefined ratio enforced when randomly selecting an order of placement of the holes in the pseudo-random pattern.

8. The system of claim 1, wherein the acoustical screen is coupled about its periphery with the projection screen and wherein the screen assembly further includes a backing fabric layer comprising an acoustically transmissive material extending over an inner surface of the acoustical screen.

9. The system of claim 1, wherein the acoustical screen is formed of thin sheet of a metal or a plastic and wherein the outer surface is painted with a paint of a color matching a color of the projection surface.

10. An acoustical screen for masking presence of an audio speaker while effectively transmitting its output, comprising:
    a screen body;
    in the screen body, a first set of circular holes with a first outer diameter;
    in the screen body, a second set of circular holes with a second outer diameter smaller than the first outer diameter; and
    in the screen body, a third set of circular holes with a third outer diameter smaller than the second outer diameter, wherein the circular holes of the first, second, and third sets are arranged in a pseudo-random pattern across a front surface of the screen body.

11. The acoustical screen of claim 10, wherein the screen body is formed from a thin sheet of metal or plastic and wherein the front surface is colored or treated for use as a front projection surface.

12. The acoustical screen of claim 10, wherein the third outer diameter is equal to or less than 0.0625 inches and the first and second outer diameters are in the range of 0.0625 to 0.25 inches.

13. The acoustical screen of claim 10, wherein the pseudo-random pattern is defined so that each of the circular holes has only a single neighboring one of the circular holes with a matching outer diameter.

14. The acoustical screen of claim 10, wherein the pseudo-random pattern is defined with a predefined ratio of the holes having the first, second, and third sizes and with the predefined ratio enforced when randomly selecting an order of placement of the holes in the pseudo-random pattern.

15. A method of generating a pattern for holes of an acoustical screen, comprising:
    selecting a number of sets of differently-sized holes for use in the acoustical screen, wherein the number is sets is greater than two;
    assigning a unique hole size to each of the sets of differently-sized holes;
    defining outer dimensions of the acoustical screen;
    generating a pattern based on the outer dimensions;
    with a hole pattern generation program run by a processor of a computing device, automatically selecting a new hole to place in the pattern formed in the generating step from the sets of differently-sized holes;
    with the hole pattern generation program, automatically positioning the new hole in the pattern at a random location, wherein the random location is selected to provide a predefined spacing between adjacent hole pairs; and
    repeating the selecting and the positioning until the pattern is filled.

16. The method of claim 15, wherein the hole pattern generation program performs the positioning of the new hole in the pattern by randomly selecting a drop location along a defined upper edge of the pattern and simulating a gravity-based drop of the new hole from the drop location.

17. The method of claim 15, after the repeating step, performing optimization to determine whether one or more of the holes has more than a predefined number of neighboring holes with a matching size and, in response to an affirmative determination, moving the one or more of the holes to a new randomly selected location in the pattern.

18. The method of claim 17, wherein the predefined number is equal to one.

19. The method of claim 15, further comprising defining a ratio of numbers of holes from each of the sets of differently-sized holes for inclusion in the pattern and wherein the selecting step is performed based on the ratio.

20. The method of claim 15, wherein the number of the sets of differently-sized holes is set to three, wherein each of the new holes is circular, and wherein each of the hole sizes defines an outer diameter in the range of 0.0625 to 0.25 inches.

* * * * *